United States Patent
Yirmiyahu

(10) Patent No.: US 10,367,360 B2
(45) Date of Patent: Jul. 30, 2019

(54) MOBILE DEVICES CHARGING SYSTEM AND METHOD

(71) Applicant: NIPE TECHNOLOGY LTD, Shoham (IL)

(72) Inventor: Ron Yirmiyahu, Shoham (IL)

(73) Assignee: NIPE TECHNOLOGY LTD., Shoham (IL)

( * ) Notice: Subject to any disclaimer, the term of this patent is extended or adjusted under 35 U.S.C. 154(b) by 263 days.

(21) Appl. No.: 15/310,778

(22) PCT Filed: Jun. 23, 2015

(86) PCT No.: PCT/IL2015/050650
§ 371 (c)(1),
(2) Date: Nov. 13, 2016

(87) PCT Pub. No.: WO2016/001913
PCT Pub. Date: Jan. 7, 2016

(65) Prior Publication Data
US 2017/0085104 A1    Mar. 23, 2017

(30) Foreign Application Priority Data

Jun. 29, 2014  (IL) .......................................... 233451

(51) Int. Cl.
*H02J 7/00* (2006.01)
*H04M 19/08* (2006.01)
(Continued)

(52) U.S. Cl.
CPC ............ *H02J 7/0044* (2013.01); *G01P 15/00* (2013.01); *H04B 1/3883* (2013.01); *H04M 19/08* (2013.01)

(58) Field of Classification Search
CPC .............................. H02J 7/0044; H04M 19/08
(Continued)

(56) References Cited

U.S. PATENT DOCUMENTS

| 5,870,615 A | 2/1999 | Bar-On et al. |
| 7,345,954 B2 | 3/2008 | Ehrsam et al. |

(Continued)

OTHER PUBLICATIONS

"Use Power Management", Technical Disclosure Commons <http://www.tdcommons. 1-3,6,7,11-13,16org/cgi/viewcontent.cgi?article=1024&context=dpubs_series> Berg, Alec; Palatin, Vincent; and Broch, Todd Jan. 13, 2015 (Jan. 13, 2015).

(Continued)

*Primary Examiner* — Edward Tso
*Assistant Examiner* — Aaron Piggush
(74) *Attorney, Agent, or Firm* — The Roy Gross Law Firm, LLC; Roy Gross

(57) ABSTRACT

The invention comprises systems and methods for transferring energy between mobile devices such as smartphones comprising: energy transfer means; at least one accelerometer; a micro-controller with predefined instructions, is adapted to control charging parameters; a DC-DC converter; wherein, said accelerometer readings are processed and fed into said microcontroller for controlling said charging parameters using said predefined instructions; further wherein, control over said charge parameters is achieved by changing the position of at least one of the mobile devices. A number of different embodiments are provided allowing for different transfer schemes.

14 Claims, 2 Drawing Sheets

(51) Int. Cl.
*G01P 15/00* (2006.01)
*H04B 1/3883* (2015.01)

(58) Field of Classification Search
USPC ............................... 320/103, 114, 140, 157
See application file for complete search history.

(56) References Cited

U.S. PATENT DOCUMENTS

| | | |
|---|---|---|
| 8,405,402 B2 | 3/2013 | Terlizzi |
| 2011/0016333 A1 | 1/2011 | Scott et al. |
| 2012/0231857 A1 | 9/2012 | Hsu |
| 2013/0002191 A1 | 1/2013 | Jung et al. |
| 2013/0214615 A1 | 8/2013 | Taleb et al. |
| 2014/0021798 A1* | 1/2014 | Kesler ..................... H01F 38/14 307/104 |
| 2014/0159637 A1* | 6/2014 | Ebersold ............... H02J 7/0068 320/101 |

OTHER PUBLICATIONS

"Donor Cable bracelet transfers battery power from one smartphone to the other" http://www. 14,15danmgeeky .com/2014/06/0 5/22000/donor-cable-transfers-battery-power-onesmartphone.html Y &R Moscow Jun. 5, 2014 (Jun. 5, 2014).
International Search Report for PCT/IL2015/050650 Completed Dec. 3, 2015; dated Dec. 7, 2015 3 Pages.
Written Opinion for PCT/IL2015/050650 Completed Dec. 3, 2015; dated Dec. 7, 2015 4 Pages.

\* cited by examiner

MOBILE DEVICES CHARGING SYSTEM AND METHOD

RELATED APPLICATIONS

This application is a National Phase of PCT Patent Application No. PCT/IL2015/050650 having International filing date of Jun. 23, 2015, which claims the benefit of priority of IL Application No. 233451 filed on Jun. 29, 2014. The contents of the above applications are all incorporated by reference as if fully set forth herein in their entirety.

FIELD OF THE INVENTION

The present invention relates to the field of energy transfer between mobile devices.

BACKGROUND OF THE INVENTION

Mobile devices require charging over increasingly short timespans due to increased use, clock speeds, and other energy demands. As mobile devices intend to be, as their name indicates—mobile—the ability to keep them constantly, or intermittently within short intervals, charged serves as a major challenge to mobile devices users. Battery capacity while increasing has not experienced an increase that keeps pace with the increased energy demand of mobile devices such as cellphones, PDAs, laptops and the like.

Many solutions have been invented to attempt to deal with this problem. Some of these inventions include external battery packs which, when connected to a mobile device are able to give it an energy boost. Additionally, as in the case of certain cellular phones and laptops, an additional battery may be purchased for the device and carried around with the user. However, these solutions are less than ideal, since the user must spend considerable amounts of money on these solutions, and must also carry around expensive and sometimes bulky and heavy gadgets in order to charge a user's battery.

Additionally, a major disadvantage of current technology is that different devices, although they may have similar input/output capacities, have different physical connections in the device. Therefore often times, even when an individual may have access to a charger, it may deliver the correct energy input, but may be physically unable to connect to the device.

Many mobile devices have another limit which the present invention aims to solve. This limit is the inability of the device to output energy from the port from which it receives energy. This means that said devices may be charged but cannot export energy to charge them.

Another drawback of existing devices involves their need for external control means to initiate and control the transfer of energy between devices. Every known device and method in the field requires an application running on at least one of the mobile devices, or a physical switch located on the device itself.

Even if there are various devices for energy transfer between mobile devices that do not involve the use of such an application or physical switch, such devices may offer only a limited functionality, wherein energy flows only in one direction—from a mobile device with higher potential energy to the lower energy mobile device.

Although a mobile application running on one of the mobile devices provides for an effective way for users to monitor and control the rate, level, and duration of energy transfer, the need to install and run an application on a mobile device, complicates operation methods for the user that is often reluctant to install a new application on his mobile device.

Moreover, running a mobile application before every use of the energy transfer device, complicates and hinders the functionality to the user. Moreover, the need for a mobile application forces skilled professionals to produce a different application for every mobile device model existent. Such extreme measures often create severe compatibility problems with mobile devices of different manufacturers.

On the other hand, energy transfer devices with typical simple physical switches offer only limited functionality allowing the user often only to control the direction of energy flow. Such simple physical switches involve using fragile components on top of the energy transfer device shape preventing designs involving clean and slick designs lines. Using such physical external switch components reduces the device's life span increasing the risk of breaking the device.

An additional shortcoming of such devices is that when in transit or otherwise not in the vicinity of charging sources such as wall voltage, storage batteries, or charged mobile devices, there is generally no option for energy harvesting from the surroundings. Therefore there remains a long-felt need for improved energy transfer means and methods for mobile devices.

SUMMARY OF THE INVENTION

The present invention comprises systems and methods for transferring energy between mobile devices such as smartphones and laptops, comprising:
  a. energy transfer means adapted to allow the physical transfer of energy from one said mobile device to the other said mobile device;
  b. at least one accelerometer;
  c. a micro-controller with predefined instructions, is adapted to control such charging parameters as direction of energy flow, total amount of transferred energy, and charging duration between said mobile devices through said energy transfer means;
  d. a DC-DC converter adapted to take an input DC voltage and convert it to a second output DC voltage sufficient for charging;
wherein, said accelerometer readings are processed and fed into said microcontroller for controlling said charging parameters using said predefined instructions; further wherein, control over said charge parameters is achieved by changing the position of at least one of the mobile devices.

A number of different embodiments are provided allowing for different transfer schemes.

For the sake of simplicity and illustration, the operation method of the present invention may be the following:
  a. User connects two mobile devices to a device by the present invention;
  b. User moves one of the mobile devices above the other;
  c. Said accelerometer detects change in acceleration in relation to earth surface and further, sends said accelerometer readings for the purpose of calculating position and orientation data;
  d. Said position and orientation data are calculated with various known algorithms by a micro-computer installed on the device or by one of the mobile devices;
  e. Then, the device determines that one mobile device is above the others, and said micro-controller issues a predetermined instruction: charge lower device from higher device.

The present invention allows for simple and intuitive energy transfer control means obviating the need for external physical switches and obviating running a dedicated software application while removing the problems involved with such means.

A user of a device by the present invention may control predefined charging parameters by simply changing the relative position of one mobile device to the other or changing the devices orientation in relation to the earth surface.

For example, after connecting two mobile devices to the energy transfer device, the user may choose to charge one of said mobile devices by positioning the charging device above the charged device just as, figuratively speaking, one may try to pour water from one glass to another.

In another embodiment, a user may steepen the orientation angle between the charging device to the charged device and the earth surface for increasing the amount of energy transferred.

It is within the provision of the invention that the DC-DC converter is characterized in providing a variable output voltage. Wherein, a change in the accelerometer readings will trigger the microcontroller to change the output voltage to the charged mobile device.

For example, after connecting two mobile devices to the energy transfer device, and after positioning the charging device above the charged device, a user may change the orientation angle between the charging device to the charged device and the earth surface for increasing the rate of charging by increasing the charging voltage using the variable DC-DC converter.

The foregoing embodiments of the invention have been described and illustrated in conjunction with systems and methods thereof, which are meant to be merely illustrative, and not limiting. Furthermore just as every particular reference may embody particular methods/systems, yet not require such, ultimately such teaching is meant for all expressions notwithstanding the use of particular embodiments.

BRIEF DESCRIPTION OF THE DRAWINGS

Embodiments and features of the present invention are described herein in conjunction with the following drawings, in which.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

The term 'mobile device' hereinafter refers to any portable device having Turing-equivalent capability including smartphones, cellphones, PDAs, tablets, phablets, laptop computers, wearable computers, smart watches, smart glasses, and the like.

The invention comprises systems and methods for transferring energy between mobile devices such as smartphones. A number of different embodiments are provided allowing for different transfer schemes.

Power in general may be transferred from a power line in the cable such as 3.3V or 5V line of the USB2 cable or any other protocol or connection, which as the reader will doubtless recall comprises the aforementioned 3.3V or 5V line, a ground or 0V line, and one or more data lines such as the two data lines (D+ and D−) in the standard USB2 case, or any other protocol or connection.

As the reader will further note, July 2012 saw the USB Promoters Group announced the finalization of the USB Power Delivery ("PD") specification, an extension that specifies "PD aware" USB cables with standard USB type AB connectors, adapted to deliver up to 100 W of power at 20 V. For PD-aware cables with USB-micro B/AB connectors the maximum power supported is up to 60 W at 20 V, 36 W at 12 V and 10 W at 5 V. In all cases, either host-to-device or device-to-host configurations are supported. Pursuant to this standard, it is possible to draw power from a given device using a PD aware cable with no further ado.

Figure 1:
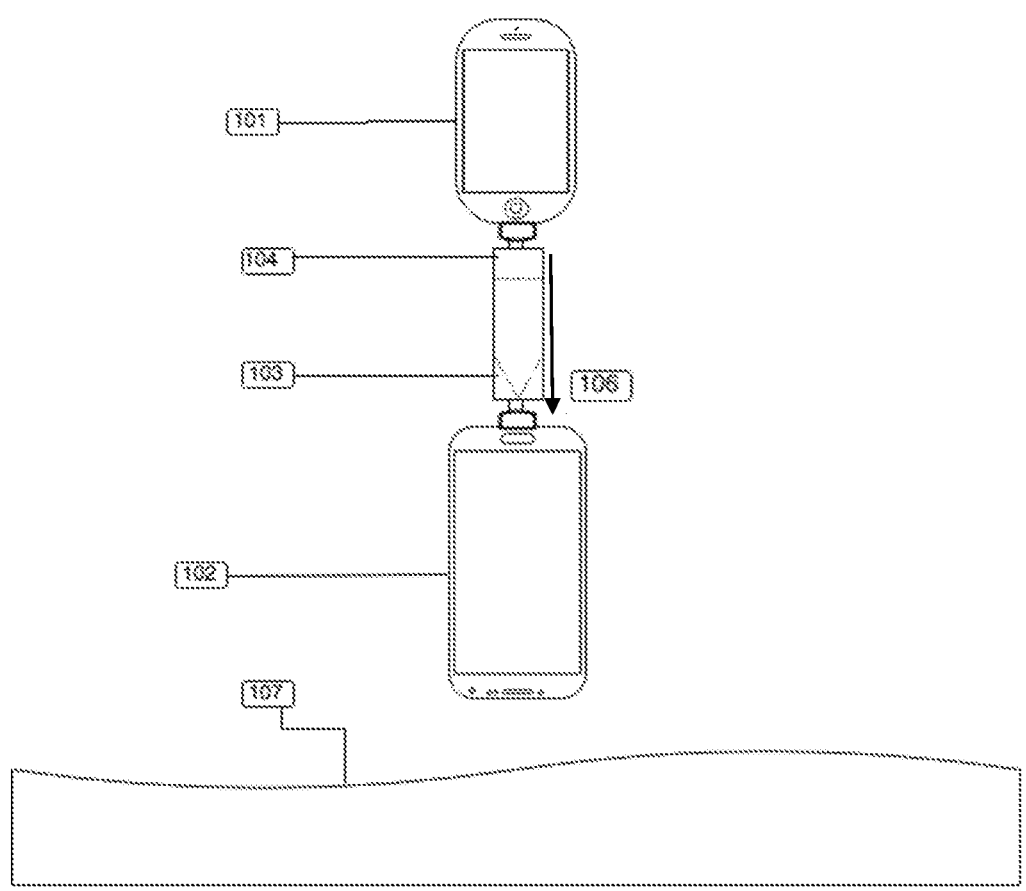
FIG. 1 illustrates an embodiment of this invention.

For the avoidance of doubt, the mention of USB or any other connection or protocol are for illustration purposes only and are not meant to limit the present invention in any way. Thus one embodiment of the invention comprises a PD aware USB cable adapted to transfer energy from device to device Additionally, the present invention can be adapted, either by connectors at the end of the cable or by separate cables, to connection to different devices containing a variety of connections. More importantly, the present invention not only physically attaches adapters to the end of the invention in order to make it adaptable, it also has the capacity to instruct each device it connects to, to output or receive power The Energy Transfer Device Referring initially to FIG. 1. A device for incorporating and controlling the transfer of energy from a first mobile device 101 to a second mobile device 102 comprising:
a. energy transfer means adapted to allow the physical transfer of energy from one said mobile device to the other said mobile device;
b. at least one accelerometer 104;
c. a micro-controller 103 having predefined instructions adapted to control such charging parameters as direction of energy flow, total amount of transferred energy, and charging duration between said mobile devices through said energy transfer means;
d. a DC-DC converter 103 adapted to take an input DC voltage and convert it to a second output DC voltage sufficient for charging
wherein, said accelerometer readings are processed and fed into said microcontroller 103 for controlling said charging parameters using said predefined instructions; further wherein, control over said charge parameters is achieved by changing the position of at least one of the mobile devices 101, 102.

The Accelerometer Measurements, Positioning and Orientation Data

An accelerometer in the meaning of the present invention is a device that measures 'proper acceleration' which is the acceleration that the accelerometer 'feels' in relation to a freefall state. For example, at rest on the earth surface, the accelerometer will read 1 g upwards. As such, the accelerometer outputs constant readings of the present proper acceleration vector (magnitude and direction in relation to the earth surface).

Using known calculation methods in the art, one may calculate the accelerometer's orientation from said proper acceleration vector readings. For this matter see various articles in the field such as: M. Pedley, *Tilt Sensing Using a Three-Axis Accelerometer*, March 2013;

Furthermore, using known calculation methods in the art, one may convert said proper acceleration vector readings into positioning vector data. For this matter see various articles in the field such as: K. Seifert and O Camacho, *Application note: Implementing positioning Algorithms accelerometers*, February 2007; CH Robotics, *Estimating Velocity and Position Using Accelerometers*, October 2012.

The required conversions and calculations may be accomplished using such means as a firmware program running in a simple microcomputer that is configured in the energy transfer device itself, or with the means of software program run in the background of one of the connected mobile devices 101, 102.

Said program records the accelerometer 104 readings, and with known calculation methods in the art converts the proper acceleration readings into positioning data or into orientation data (hereinunder: "Input data").

It should be mentioned that for determining occurrence of the trigger events for controlling energy transfer (e.g. positioning one mobile device above the other, or changing the angle thereof), both positioning and orientation algorithms may be used. Where Reference made herein only to one specific algorithm, it is for purposes of illustration only and not intended to limit the scope of the invention.

In addition, some embodiments of the present invention utilize an energy transfer device without accelerometers onboard and instead, said microcontroller is in communication with the mobile devices' accelerometers. The program takes the accelerometer readings and executes the required calculations.

Controlling Charging with Input Data

Afterwards, the Input data is fed into the microcontroller 103 which controls the various predefined charge parameters with the use of said Input data and microcontroller predefined instructions.

Charge Control Methods

The microcontroller predefined instructions comprise methods for controlling various charge parameters. For example:

a) If mobile devices are connected to device, check Input data.
b) If Input data indicates mobile device A is higher than mobile device B, set direction of charge parameter: A to B;
c) If Input data indicates mobile device B is higher than mobile device A, set direction of charge parameter: B to A.

The present invention provides another method for controlling various charge parameters:

a) If mobile devices are connected to device, check Input data;
b) Calculate the orientation angle between the higher positioned mobile device, the lower mobile device and the earth surface.
c) set amount of transferred charge to 10% of the charged mobile device capacity per every 10 degrees angle (e.g., a 45 degree angle results in transferring a charge amount that equals to 45% of the target mobile device battery capacity);

It should be mentioned that other charge control methods that use different parameters than those illustrated herein are also within the provision of the present invention, since the usage of various parameters will be obvious to one skilled in the art.

Solid vs Flexible Configurations

It should be mentioned that there are embodiments where the energy transfer device is constructed in a solid inflexible configuration (FIG. 1) such as a solid bar shape and there are embodiments where the energy transfer device is constructed in a flexible configuration (FIG. 2) such as a bracelet.

In a solid configuration of the energy transfer device, required only one accelerometer which may be positioned adjacent to one of the energy transfer device's ends (e.g., only 104) or at the center of the energy transfer device.

Figure 2:
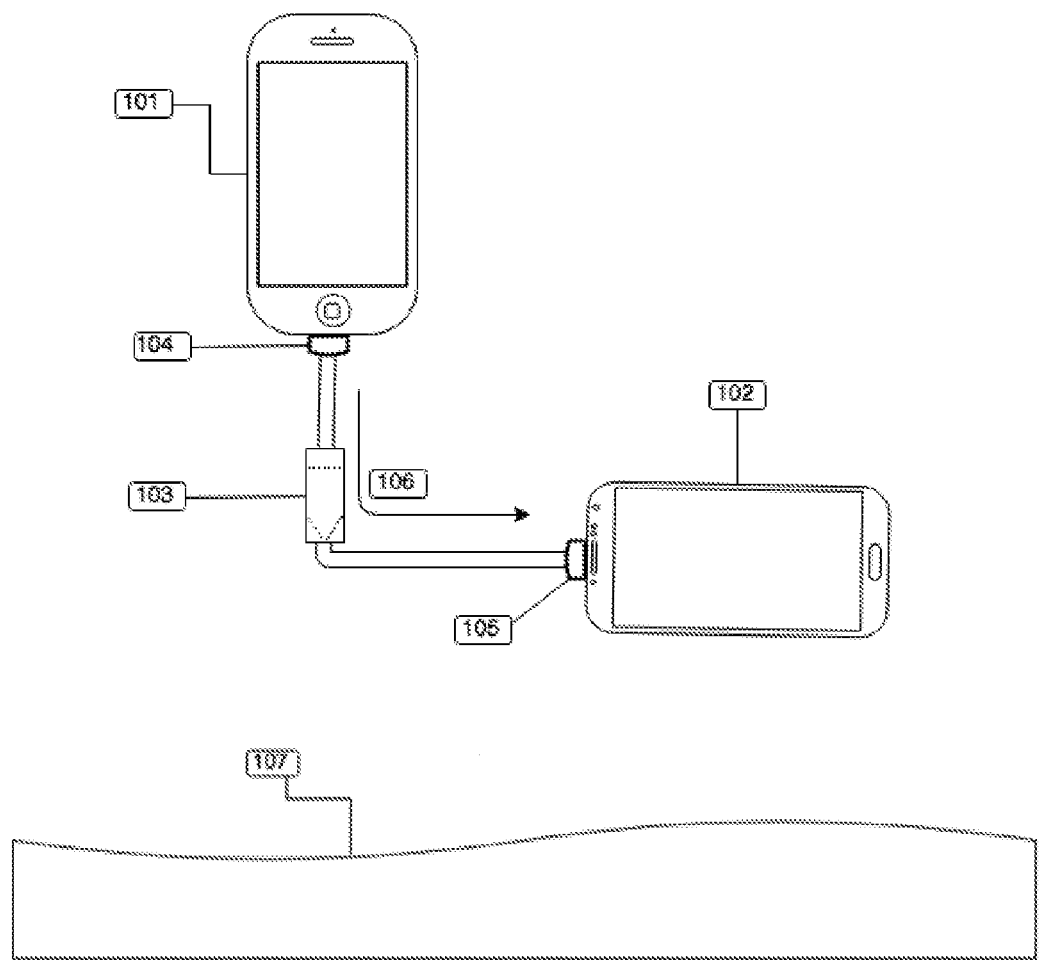
FIG. 2 illustrates another embodiment of this invention.

In a flexible configuration like the one illustrated in FIG. 2, for the device to operate properly required are two accelerometers (104, 105) positioned each adjacent to one of the energy transfer device's ends. This requirement is due to the fact that in flexible configurations, raising one mobile device will not inherently lower the other device.

The DC-DC Convertor

The energy transfer further comprises a DC-DC boost converter (or any other type of converter per need such as down converter, up converter or current mode power transfer) and switching means, allowing for voltages less than the nominal 5V USB2 or any other connection or protocol, supply voltage to be boosted to levels high enough to allow rapid charging even from a largely depleted device. For example a device whose output voltage has dropped to 4.8 VDC may be used to charge a device still at the nominal 5 VDC since the boost converter may be designed to provide an output voltage of (for example) 5.1 VDC, or alternatively may be designed with variable output voltage to more effectively deal with a variety of loads. Furthermore, the converter employed may in some embodiments be not only a boost converter but also a boost-buck converter, allowing for use of supply voltages that are not near the 5 VDC USB standard, such as 12V sources.

It is within the provision of the invention that said DC-DC converter is a variable DC-DC converter providing variable output voltage. Wherein, a change in the accelerometer readings will trigger the microcontroller to change the output voltage to the charged mobile device.

Charging Voltage Control Method

The present invention provides another method for controlling various charge parameters:

a) If mobile devices are connected to device, check Input data;
b) Calculate the angle between the higher positioned mobile device, the lower mobile device and the earth surface.
c) using said variable DC-DC converter set the charging voltage parameter by 0.5V for every 9 degrees angle (e.g., a 45 degree angle triggers 2.5V voltage);

Means to Instruct

Furthermore, the device may have means to instruct that is a software application installed in said mobile device which is intended to receive the charge, adapted to conduct electronic communications with the mobile device intended to perform the charge, allowing a user to instruct the charging a mobile device which does not normally emit energy via its charging socket to do ("Charging Control"). Alternatively, the ability to instruct the charging device to emit the energy needed for the charge may be performed by the mobile device receiving the charge via the invention.

Bracelet Flexible Configuration

Another option is a cable designed in the form of a bracelet, which has ends adapted both to mate to each other and to serve as plugs compatible with various device outlets.

A component in the bracelet allows the transfer of power from one mobile device to another.

A Configuration with a Data Display

A further embodiment is considered where, the energy transfer device further comprising data display means for displaying various information types, including: charging parameters, time, connected mobile devices' properties, charging progress indication, 'time elapsed' for charging indication, etc.

A Wristwatch Flexible Configuration

A further embodiment is considered where, the energy transfer device is further designed in the form of a wrist watch having ends adapted to mate together and to furthermore be used as plugs for connecting to said mobile devices.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The invention claimed is:

1. A device for incorporating and controlling the transfer of energy from a first mobile device to a second mobile device comprising:
   a. energy transfer means adapted to allow the physical transfer of energy from one said mobile device to the other said mobile device;
   b. at least one accelerometer;
   c. a micro-controller having predefined instructions, adapted to control charging parameters including direction of energy flow, total amount of transferred energy, and charging duration between said mobile devices through said energy transfer means; and
   d. a DC-DC converter adapted to take an input DC voltage and convert it to an output DC voltage sufficient for charging;
   wherein, said accelerometer readings are processed and fed into said microcontroller for controlling said charging parameters using said predefined instructions;
   wherein, control over said charge parameters is achieved by changing the position of at least one of the mobile devices, and
   wherein said instructions include the following steps:
      checking Input data if the mobile devices are connected;
      calculating the orientation angle between the higher positioned mobile device, the lower mobile device and the earth surface;
      setting the parameter: 'amount of transferred charge' to X % of the charged mobile device capacity per every Y degrees angle between the higher positioned mobile device, the lower positioned mobile device and the earth surface.

2. A method for controlling the charging parameters of a device by claim 1 where said instructions are comprised of the following steps:
   b. if Input data indicates mobile device A is higher than mobile device B, set direction of charge parameter: A to B;
   c. if Input data indicates mobile device B is higher than mobile device A, set the parameter: 'direction of charge': B to A.

3. The device of claim 1 further comprising means to instruct a software application installed in said mobile device which is intended to receive the charge and is adapted to conduct electronic communications with the mobile device intended to perform the charge, thereby allowing a user to instruct the charging mobile device, which does not normally emit energy via its charging socket to do so.

4. The device of claim 1 wherein said DC-DC converter is selected from the group consisting of: fixed-output boost converter; fixed-output buck-boost converter; variable output boost converter; and variable output buck-boost converter.

5. The device of claim 1 wherein said DC-DC converter is a variable DC-DC converter providing variable output voltage; wherein, a change in the accelerometer readings will trigger the microcontroller to change the output voltage to the charged mobile device.

6. The device of claim 1 wherein the device is able to connect to two or more receiving mobile devices and simultaneously transfer energy to them.

7. The device of claim 1 wherein the device is able to connect to two or more giving mobile devices and simultaneously transfer energy from them.

8. The device of claim 1 wherein said second DC voltage is chosen to allow for rapid charging.

9. The device of claim 1 wherein said energy transfer means is a PD aware USB cable, or any other connection or protocol adapted to transfer energy from device to device, with one end being defined and marked as an energy supply side and the other end being defined and marked as an energy delivery side.

10. The device of claim 1 wherein said energy transfer means is a PD aware USB cable, or any other connection or protocol provided with means to control the direction of energy transfer, between host-to-device and device-to-host energy transfer.

11. The device of claim 1 further comprising data display means for displaying various information types, including: charging parameters time, connected mobile devices' properties, charging progress indication, 'time elapsed' for charging indication, etc.

12. The device of claim 1, wherein the device is designed in the form of a bracelet having ends adapted to mate together and to furthermore be used as plugs for connecting to said mobile devices.

13. The device of claim 11, wherein the device is designed in the form of a wrist watch having ends adapted to mate together and to furthermore be used as plugs for connecting to said mobile devices.

14. A device for incorporating and controlling the transfer of energy from a first mobile device to a second mobile device comprising:
   a. energy transfer means adapted to allow the physical transfer of energy from one said mobile device to the other said mobile device;
   b. at least one accelerometer;
   c. a micro-controller having predefined instructions, adapted to control charging parameters including direction of energy flow, total amount of transferred energy, and charging duration between said mobile devices through said energy transfer means; and
   d. a DC-DC converter adapted to take an input DC voltage and convert it to an output DC voltage sufficient for charging, said DC-DC converter is a variable DC-DC converter providing variable output voltage; wherein, a change in the accelerometer readings will trigger the microcontroller to change the output voltage to the charged mobile device;

wherein, said accelerometer readings are processed and fed into said microcontroller for controlling said charging parameters using said predefined instructions; and wherein, control over said charge parameters is achieved by changing the position of at least one of the mobile devices, wherein said instructions include the following steps:
  checking Input data if the mobile devices are connected;
  calculating the orientation angle between the higher positioned mobile device, the lower mobile device and the earth surface;
  using said variable DC-DC converter change in output voltage set the parameter: 'charging voltage' to X Volts for every Y degrees angle between the higher positioned mobile device, the lower positioned mobile device and the earth surface.

* * * * *